Dec. 29, 1970     E. E. ZIEGLER     3,550,405
POSITIVE FILL CONTROL AND WEIGHT DISTRIBUTION
SYSTEM FOR AN AUTOMATIC WASHER
Filed Nov. 26, 1968     2 Sheets-Sheet 1

INVENTOR.
EDWIN E. ZIEGLER
BY James E. Espe
HIS ATTORNEY

Dec. 29, 1970                E. E. ZIEGLER                3,550,405
POSITIVE FILL CONTROL AND WEIGHT DISTRIBUTION
SYSTEM FOR AN AUTOMATIC WASHER
Filed Nov. 26, 1968                                  2 Sheets-Sheet 2
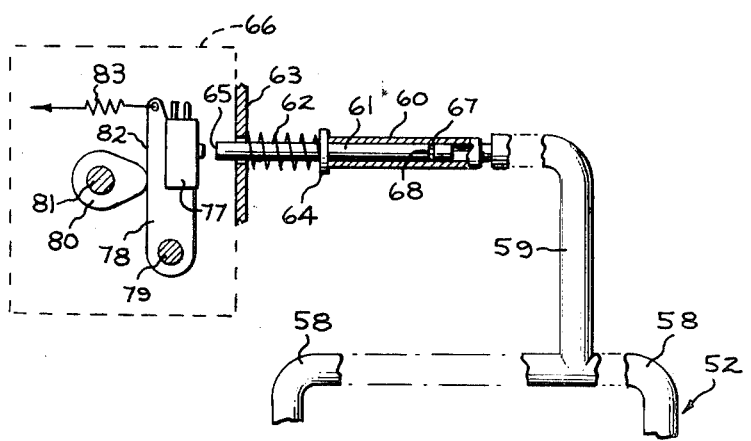
FIG. 3
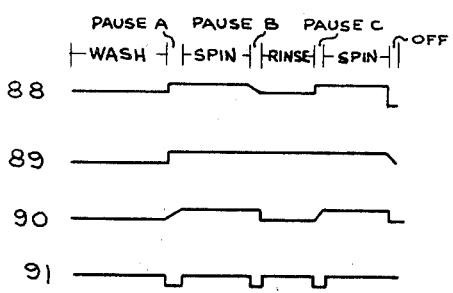
FIG. 6
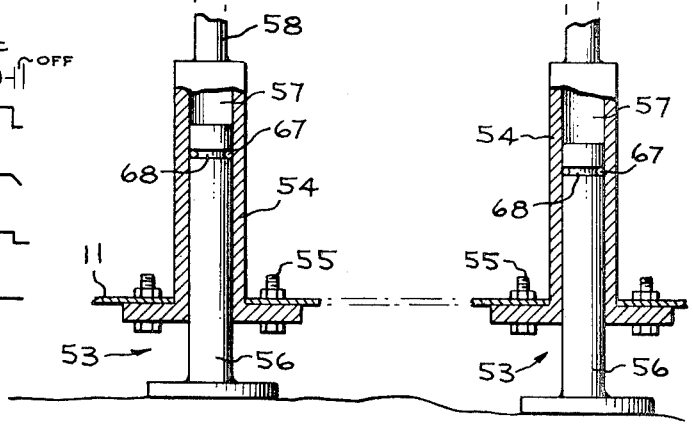
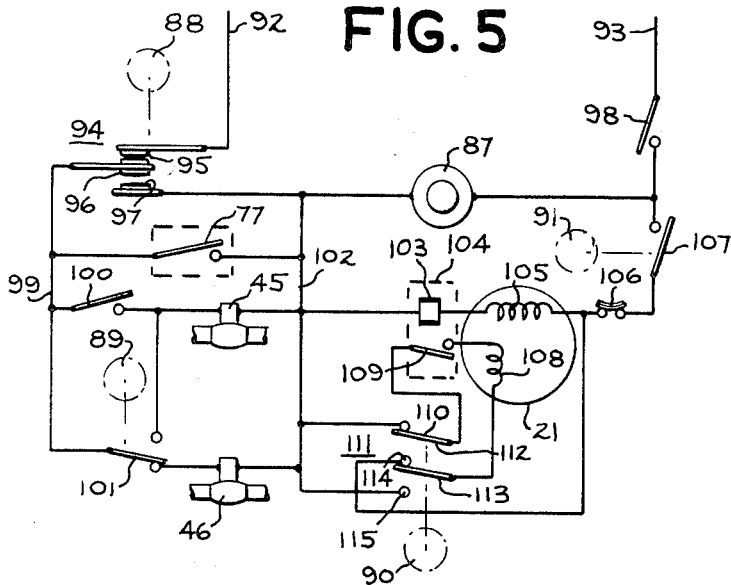
FIG. 5
FIG. 4
INVENTOR.
EDWIN E. ZIEGLER
BY James E. Cope
HIS ATTORNEY

United States Patent Office 3,550,405
Patented Dec. 29, 1970

3,550,405
POSITIVE FILL CONTROL AND WEIGHT DISTRIBUTION SYSTEM FOR AN AUTOMATIC WASHER
Edwin E. Ziegler, Lynnfield, Mass., assignor to General Electric Company, a corporation of New York
Filed Nov. 26, 1968, Ser. No. 779,037
Int. Cl. D06f 37/24, 39/08
U.S. Cl. 68—23.3                  8 Claims

ABSTRACT OF THE DISCLOSURE

A positive fill control and weight distribution system is provided for an automatic clothes washer having a supporting structure with four legs depending from the structure and adapted to engage a supporting surface. Two of the legs comprises rigid members, and two comprise pistons reciprocally positioned within downwardly opening cylinders rigidly secured to the structure. A pressure equalization conduit interconnects the cylinders above the pistons thereby to equalize the force exerted on the pistons regardless of their differing relative extended lengths caused by unevenness of the supporting surface. A branch conduit communicates at one end with the pressure equalization conduit and at the other end with a control cylinder having an inwardly biased control piston reciprocally positioned therein. An activating means is selectively positioned within the path of reciprocation of the control piston for terminating admission of water to the washer when the pressure in the cylinders and interconnecting conduits has been increased to a predetermined value by the weight of a desired quantity of water being delivered to the washer.

BACKGROUND OF THE INVENTION

This invention relates to machines such as automatic clothes washing machines, and more particularly, to a system for concurrently balancing the weight of the washer among its supporting legs and assuring the delivery of a predetermined quantity of water to the washing basket.

It is especially important in automatic clothes washers which accomplish a spin or centrifugal water extraction operation that the weight distribution of the machine be approximately balanced among the support contact members of the machine for proper operation. If the weight distribution is not so balanced, as may occur when the washer is required to stand on uneven surfaces leaving one or more of its supporting legs suspended above a low point on the supporting surface, forces generated by the rotating basket and its load of clothes during the spin operation may cause the machine to shake badly and to "walk" across the base surface on which the washer is positioned. Complicating the solution of this problem are at least two additional factors: (1) the weight distribution of the operating components of an automatic washer is seldom exactly equal and balanced; and (2) the user may move the machine slightly during the course of its use from balanced position to a position on an uneven surface where the washer becomes unbalanced. For all these reasons it is highly desirable that automatic clothes washers be provided with a weight distribution device which is self-balancing or self-distributing in character.

Another problem of concern in automatic washer design is that of providing a positive control of the quantity of water delivered to the washer basket. As the basket is adapted to rotate at one or more speeds, it is difficult to incorporate known liquid level sensors thereon. Yet it is desirable to be able to cause the flow of water into the basket to be stopped at different levels so that a full tub of water will not have to be used where the clothes load is a relatively small one. Most known fill controls designed to perform this function provide either a timed fill which is susceptible to domestic water pressure changes and may provide an over or under fill, or operate by diverting a portion of the water input to a control accumulation tank, thereby wasting a significant quantity of water. A number of other controls operate by requiring the basket or other container to fill and overflow to initiate water shutoff, whereby all capability of terminating the admission of water at various levels is lost.

It is therefore an object of the present invention to provide an improved system for selectively controlling the amount of water admitted to the basket of an automatic clothes washer.

It is an additional object to provide an improved balancing system for distributing the weight of a vertically imposed load among the support members thereof.

It is a further object to provide a combined system for selectively controlling the amount of water admitted to the basket of a clothes washing machine and for balancing the weight of the machine among its support contact members.

SUMMARY OF THE INVENTION

In accordance with one aspect of the invention, a positive fill control is provided for use in an automatic washer which has at least three legs depending from a supporting structure, a basket rotatably supported within the structure, and conduit means adapted for connection to a source of water under pressure and adapted to deliver water to the basket. At least one of the legs has a member adapted to engage a supporting surface and associated chamber means defining a volume of fluid under pressure for exerting a force on the member in proportion to the pressure with the chamber means. Interconnected with the chamber means is a pressure responsive actuating means to terminate the admission of water to the washer in response to an increase in the pressure caused by the addition of a predetermined weight of materials and liquid to the basket.

In accordance with another aspect of my invention, a weight distributing system is provided to support a load member on a supporting surface. Comprising the system are at least three legs depending from the load member and adapted to engage the supporting surface. At least two of the legs each comprise a member adapted to engage the supporting surface and an associated chamber means defining a volume of fluid under pressure for exerting a force on the member in proportion to the pressure within the chamber means. Interconnecting each of the chamber means is a fluid containing pressure equalization conduit to equalize the pressures within the chamber means and thereby to equalize the forces exerted on the members.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawings in which:

FIG. 3 is a detail view partly in section showing one embodiment of my device; and FIG. 4 is an enlarged sectional view of an alternate embodiment of a portion of the device of FIG. 3.

FIG. 5 is a schematic diagram of an electric control circuit which may be used with my invention in the machine of FIG. 1.

FIG. 6 is a schematic view of the cam surfaces used in the control of the timer operated switches of FIG. 5.

DESCRIPTION OF THE PREFERRED EMBODIMENT

Figure 1:
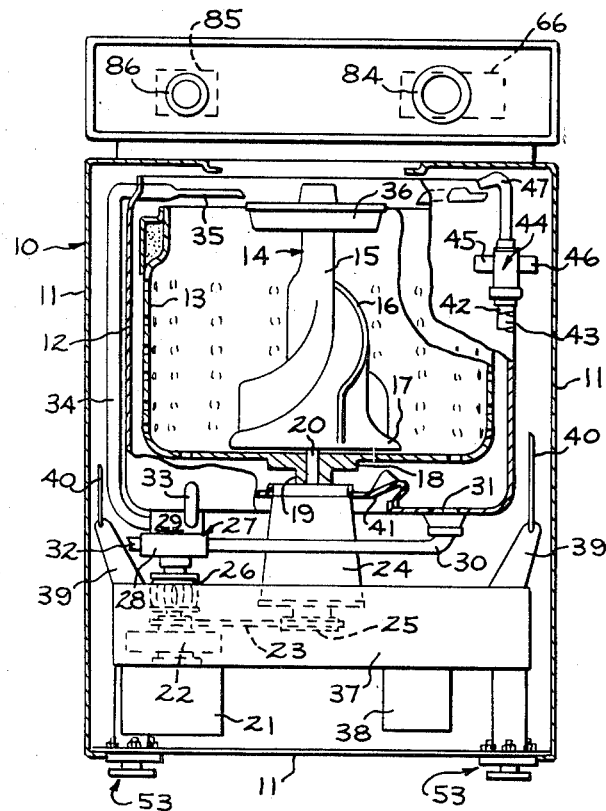
FIG. 1 is an elevational view of a washing machine incorporating one embodiment of my invention.

Referring now to the drawing, and initially to FIG. 1 thereof, there is illustrated an agitator-type vertical-axis automatic clothes washer 10 having a supporting structure or load member 11. The washer may include the various operational components conventionally utilized in a domestic automatic washing machine, for instance, an imperforate tub 12 rigidly mounted within structure 11. Rotatably supported within tub 12 is a perforate washing basket 13 for washing and rinsing clothes therein and for centrifugally extracting liquid therefrom. At the center of basket 13 there is provided an agitator 14 which includes a center post 15 having a plurality of curved water circulating vanes 16 joined at their lower end to form an outwardly flared skirt 17.

Both the clothes basket 13 and the agitator 14 are rotatably mounted. The basket is mounted on a flange 18 of a hub 19 and the agitator 14 is mounted on a shaft 20 which extends upwardly through the hub 19 and through the center post 15 and is secured to the agitator so as to drive it. During one possible cycle of operation of the washer 10, fabrics, detergent and a predetermined quantity of liquid are introduced into the tub 12 and basket 13, and the agitator is then oscillated back and forth about its axis to wash the clothes within the basket. After a predetermined period of this washing action, basket 13 is rotated at high speed to centrifugally extract the washing liquid from the fabrics and discharge it to a drain (not shown). Following this extraction operation, a supply of clean liquid is introduced into the basket for rinsing the fabrics and the agitator is again oscillated. Finally, the basket is once more rotated at high speed to extract the rinse liquid.

The basket 13 and agitator 14 may be driven by any suitable means. By way of example, I have shown them as driven from a reversible motor 21 through a drive mechanism including a clutch 22 mounted on the motor shaft. The motor is tailored so as to be used to its full extent when it accelerates the basket 13 to spin speed. In order to assist the motor during starting, clutch 22 allows the motor to start without a load and then accept the load as it comes up to speed. A suitable belt 23 transmits power from clutch 22 to a transmission assembly 24 through a pulley 25. Thus, depending upon the direction of motor rotation, the pulley 25 of transmission 24 is driven in opposite directions. The transmission 24 is so arranged that it supports and drives both the agitator drive shaft 20 and the basket mounting hub 19. When motor 21 is rotated in one direction, the transmission causes agitator 14 to oscillate and, when motor 21 is driven in the opposite direction, the transmission rotates the clothes basket 13 and agitator 14 together at high speed for centrifugal fluid extraction. While the specific type of transmission used does not form a part of the present invention, reference is made to U.S. Pat. No. 2,844,225 issued July 22, 1958 to Mr. James R. Hubbard et al. and assigned to the assignee of the instant invention. That patent discloses in detail the structural characteristics of a transmission assembly suitable for use in the illustrated machine.

In addition to operating the transmission 24 as described, motor 21 also provides a direct drive through a flexible coupling 26 to a pump structure 27, which includes two separate pumping units 28 and 29 which are operated simultaneously in the same direction by motor 21. Pump unit 28 has an inlet connected by conduit 30 to an opening 31 formed in the lowermost part of tub 12 and an outlet connected by a conduit 32 to a suitable drain (not shown). Pump 29 has an inlet connected by a conduit 33 to the interior of tub 12 and an outlet connected by conduit 34 to a nozzle 35 which is positioned to discharge into a suitable perforate bottomed filter pan 36 which may be secured to the top portion of agitator 14 so as to be removable therefrom. With this structure, then, when the motor is operating so as to provide agitation, pump unit 29 draws liquid in through conduit 33 from tub 12 and discharges it through conduit 34 into filter pan 36, and then down through the small openings provided in the bottom of the filter pan back into the basket. Conversely, when the motor is reversed so as to rotate the basket 13 and agitator 14 together at high speed to centrifugally extract fluid from fabrics in the basket, pump unit 28 will draw liquid in from opening 31 through conduit 30 and discharge it through conduit 32 to drain. Each of the pump units is substantially inoperative in the direction of rotation in which it is not used.

Basket 13, agitator 14, motor 21, clutch 22, and transmission 24 from a suspended washing and centrifuging system which may be supported by the stationary structure. While any suitable suspension system structure may be used, I show by way of example a suspension structure which includes a bracket member 37 with transmission 24 mounted on the top thereof and motor 21 mounted to the underside thereof. A counterweight 38 is mounted on the bracket member 37 opposite motor 21 to aid in balancing the weight distribution of the various components of the suspended system. The bracket member 37, in turn, is secured to upwardly extending rigid members 39 and each of the two upwardly extending members 39 is connected to a cable 40 supported from the top of the machine. While only a portion of the suspension system is shown in the drawing, such a vibration isolation system is fully described and claimed in U.S. Pat No. 2,987,190 issued June 6, 1961 to Mr. John Bochan and assigned to the assignee of the instant invention.

In order to accommodate the movement which occurs between basket 13 and tub 12 without any danger of fluid leakage between them, the stationary tub 12 is joined to the upper part of transmission 24 by a flexible boot member 41. A member of this type is described and claimed in U.S. Pat. No. 2,959,966 issued Nov. 15, 1960 to Mr. John Bochan and assigned to the assignee of the instant invention.

Hot and cold water may be supplied to the machine through conduits 42 and 43 which are adapted to be connected respectively to sources of hot and cold water (not shown). Conduits 42 and 43 extend into a conventional mixing valve structure 44 having solenoids 45 and 46 and being connected to a hose 47. In a conventional manner selective or concurrent energization of solenoids 45 and 46 will provide the passage of hot, cold or warm water from the mixing valve 44 through the hose 47. Hose 47 is positioned to discharge into the basket 13 so that when one or both of solenoids 45 and 46 are energized, water enters basket 13 and tub 12.

Figure 2:
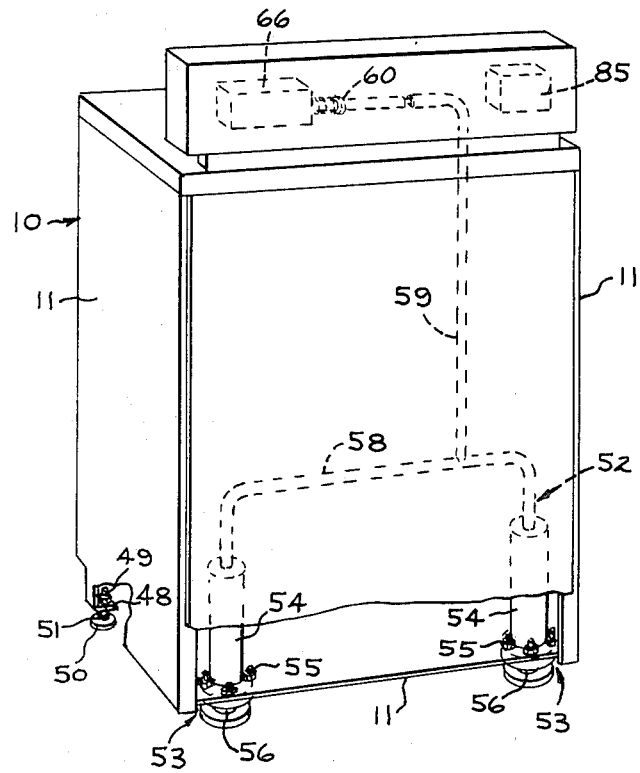
FIG. 2 is a perspective view of the back side of the washer of FIG. 1, the view being partly broken away to illustrate details.

As a washing machine is often mounted on a basement floor having a predominant slope toward one point for drainage, some means of compensation for this slope is required to maintain washer 10 substantially level for proper operation. Referring now more particularly to FIG. 2, in order to compensate for such a slope, each of the lower front corners of cabinet frame 11 is seen to carry an inwardly extending tab 48 with a threaded opening which operably engages a threaded shaft 49 of leg 50. A threaded lock nut 51 likewise operably engages shaft 49 and serves to lock leg 50 in an adjusted position when screwed up tight against the underside of tab 48. In addition to a uniform slope, such as that often found in basement floors, the supporting surface on which an automatic washer is required to stand may be uneven. This may be due to faulty construction, sagging of the floor under the weight of the appliance or any one of a number of other reasons.

In accordance with one aspect of the present invention, I provide a self-leveling support system indicated generally at 52 to overcome any unevenness of the supporting surface. This self-leveling support system, as seen in FIG. 2, and in somewhat more detail in FIG. 3, includes a pair of rear legs 53 depending from the structure 11. Each of the rear legs comprises a downwardly opening leg cylinder 54 secured by suitable means such as bolts 55 to structure 11, and a leveling piston 56 reciprocally positioned within leg cylinder 54 defining therein a chamber 57 having a volume above each of the pistons 56 wherein fluid may be provided. A stabilization means in the form of a pressure equalization conduit 58 interconnects each of the chambers 57 permitting fluid flow therebetween to equalize the pressures therein.

As the leg pistons 56 are identical and expose identical areas to chambers 57, and as the pressures within chamber 57 are equalized by conduit 58, it will be seen that leg pistons 56 are subjected to equal forces. The magnitude of the total of the forces acting on both leg pistons equals the combined weight of the machine 10, the contents of basket 13 and the amount of liquid supplied to the basket, less the fraction or portion of this combined weight which is supported by the front legs 50. It will be seen, therefore, that the total force exerted on the leg pistons 56 is proportional to the combined weight of the machine 10, the contents of basket 13, and the amount of liquid delivered to basket 13. And as the leg pistons divide this total combined weight equally, as previously discussed, the force on each of the leg pistons 56, and hence the pressure exerted on the fluid in each of the chambers 57 is proportional to the above-mentioned combined weight. Furthermore, since the weight of the washer remains constant, it results that the pressure of the fluid within chambers 57 varies as a function of the contents of basket 13 and the amount of liquid supplied thereto.

In accordance with another aspect of my invention, this result is utilized to control the quantity of liquid, usually water, which is ultimately admitted to the washing basket 13 during each fill. In providing for such control, a branch conduit 59 is seen in FIG. 3 to communicate at its lower end with pressure equalization conduit 58. A control cylinder 60 communicates with the upper end of branch conduit 59 and has a control piston 61 disposed within cylinder 60 for reciprocation therein. A biasing means of any suitable sort, such as compression spring 62 acting at one end against stationary abutment 63 and at the other end against a shoulder 64 formed on piston 61 serves to bias piston 61 toward cylinder 60. Selectively positioned within the path of reciprocation of the outermost end 65 of control piston 60 is an actuating means 66 for shutting off the flow of water to the washing basket 13.

Any of a variety of sealing means may be utilized to maintain pressure within leg cylinders 54 and control cylinder 60. By way of example, in FIG. 3 each of the cylinders is provided with an O-ring seal 67 disposed within a groove 68. An alternate embodiment is shown in FIG. 4 wherein a cylinder wall 69 comprises an upper wall member 70 and a lower wall member 71 having a rolling diaphragm seal 72 secured to the interface of the members 70 and 71. A piston 73 reciprocally positioned within cylinder wall 69 has an end portion 74 of reduced diameter for engaging a central portion 75 of diaphragm 72. Defined above diaphragm 72 is a chamber 76 within which may be provided a fluid under pressure for exerting a force on piston 73.

In the preferred embodiment of my device, actuating means 66 comprises an electrical switch 77 operably disposed within the path of reciprocation of the outer end 65 of piston 60. Switch 77 is supported by a bracket 78 pivotal about shaft 79. A rotary cam 80 carried by a shaft 81 acts against surface 82 of bracket 78 for positioning thereof. A biasing means such as tension spring 83 acts upon bracket 78 to bias surface 82 toward engagement with cam 80. Means such as dial 84 (shown in FIG. 1) are provided for controlling the rotary position of cam 80. By this arrangement, the position of cam 80 and the resulting position of switch 77 is determinative of the extent of outward reciprocation of piston 61 required to activate switch 77. And as the extent of outward reciprocation of piston 61 is a function of the net force exerted by the fluid under pressure in cylinder less the biasing force of spring 62, this net force in turn being a function of the weight of the contents of basket 13 and the amount of liquid supplied to basket 13 which is necessary to activate switch 77. Cam 80 is therefore provided with several settings to allow for several water levels within basket 13. Through electrical circuitry to be explained later in detail, when switch 77 is activated, it interrupts the flow of current to solenoids 45 and 46 and thereby terminates the flow of water through hose 47 to basket 13.

Completing now the description of the electrical control system for the machine of FIG. 1, reference is made to FIG. 5. At the heart of this control system is a sequence control assembly designated generally in FIG. 1 by the numeral 85 having a dial 86. Forming a part of the sequence control assembly 85 is a timer motor 87 which drives a plurality of cams 88, 89, 90 and 91. These cams, during their rotation by the timer motor, actuate various switches (as will be described), causing the machine to pass thruogh the cycle of operations which includes washing, spinning, rinsing and spinning. It will be understood, in connection with FIG. 5, that present day washers often include various improvements such as control panel lights, etc., which do not relate to the present invention and have omitted for the sake of simplicity and ease of understanding.

The electric circuit as a whole is energized from a power supply (not shown) through a pair of conductors 92 and 93. Cam 88 controls a switch 94 which includes contacts 95, 96 and 97; when the cam has assumed the position where all three contacts are separated, washer 10 is disconnected from the power source and is inoperative. When operation of washer 10 is to be initiated as will be explained below, switch 94 is controlled by cam 88 so that contacts 95 and 96 are engaged. When a main switch 98 is closed (by any suitable manual control, not shown), power is then provided to the control circuit of the machine from conductor 92 through contacts 95 and 96.

From contact 96, the circuit extends through a conductor 99 and a manually operated switch 100 to the valve solenoid 45. In addition, a circuit is completed from conductor 99 through a switch 101 controlled by cam 89. In the "up" position, switch 101 completes a circuit for solenoid 45 independently of switch 100; in the "down" position shown, the switch 101 completes a circuit for solenoid 46. Thus, when switch 100 is open, energization of solenoids 45 and 46 is under the control of switch 101, but when switch 100 is closed the cold water solenoid 45 may be energized independently of the position of switch 101. From the hot and cold water solenoids, the energizing circuit then extend through a conductor 102 and then to a coil 103 of a relay 104, the main winding 105 of motor 21, a conventional motor protector 106, a switch 107 controlled by cam 91, and the conductor 93.

Motor 21 is of the conventional type which is provided with a start winding 108 which assists the main winding 105 during starting of the motor and is energized in parallel therewith. When a relatively high current passes through the relay coil 103, it causes the relay contact 109 to close; this permits an energizing circuit for the start winding to be completed in parallel with the main winding through a contact 110 of the switch generally indicated at 111 and which is controlled by cam 90, contact arm 112, the relay contact 109, the start winding 108, a contact arm 113, and the contact 114 of switch 111. A circuit is also completed in parallel with motor 21 through the timer motor 87. Relay coil 103 is designed to close contact 109 when a relatively high current, of the level demanded by the motor when the motor is rotating below a predetermined speed, is passing through it. At other times, when there is no current passing through the relay coil 103 or when the current is below the required energizing level as is true in the running speed range of the motor, the contact 109 is open.

When the main winding 105 of motor 21 is in series with valve solenoids 45 and 46, as described, a much lower impedance is presented in the circuit by the motor 21 than is presented by the valve solenoids. As a result, the greater portion of the supply voltage is taken up across the solenoids and relatively little across the motor. This causes whichever of the solenoids is connected in the circuit to be energized sufficiently to open its associated water valve. As a result, water at a selected temperature is admitted to the machine through hose 47, motors 21 and 87 remaining inactive.

This action continues, with the circuitry thus arranged, so that water is admitted to basket 13 and tub 12. Because of the perforations in basket 13, the water rises in both basket 13 and tub 12 at the same rate. Water level control switch 77 associated with activating means 66 is connected across conductors 99 and 102 as shown, so that when switch 77 closes, it excludes the solenoids 45 and 46 from the effective circuit by short circuiting them. As a result the solenoids become de-energized and a high potential drop is provided across winding 105 of motor 21. This causes the relay coil 103 to close contact 109 to start the motor 21 while, at the same time, timing motor 87 starts so as to initiate the sequence of operations. It will be observed that the energization of the valve solenoids 45 and 46 on the one hand, and the energization of the drive motor 21 on the other hand are alternative in nature. In other words, when there is sufficient potential across the valve solenoids to energize them, the motor remains de-energized, and it is necessary to short the solenoids out of the circuit so that they are de-energized before the drive motor can be energized.

The switch 107 is in series with the main motor 21 but is not in series with the timer motor 87. Thus, by the opening of switch 107, the energization of motor 21 may be stopped. The timer motor will continue to operate though, as a result of the fact that the timer motor 87 is deliberately provided with an impedance much greater than that of the valve solenoids so that it will take up most of the supplied voltage and the solenoids therefore do not operate their respective valves.

A further point of the circuit of FIG. 2 is that when switch arms 112 and 113 are moved by cam 90 to engage contact 114 and a contact 115 respectively, the polarity of the start winding is reversed. The circuit from conductor 102 then proceeds through contact 115, contact arm 113, to start winding 108, relay contact 109, contact arm 112 and contact 114 to the protective device 106 and conductor 93. Thus, provided motor 21 is stopped or slowed down so that relay contact 109 is closed, the reversal of switch 111 is effective to cause the motor 21 to rotate in the opposite direction when the motor is started up again.

In order to energize motor 21 independently of the water level switch 77 and the valve solenoid, so that a spin operation may be provided without regard to the absence of the predetermined water level, cam 88 is formed so that it may close all three contacts 95, 96 and 97 of switch 94 during centrifugal liquid extraction steps. When this occurs, it causes the power to be supplied from conductor 92 directly through contact 97 to conductor 102 and the motor rather than through the water level switch or the valve solenoids.

Referring now to FIG. 6 in conjunction with FIGS. 1 and 5, a sequence of operations of the washer 10 will be described. It will be assumed that the timer has been set at the beginning of the wash step so that cam 88 has caused contacts 95 and 96 to be closed, cam 89 has caused contact 101 to move to its "down" position, cam 90 has positioned switch 111 as shown, and cam 91 has closed switch 107. At this point, the first step which takes place, because of the aforementioned impedance relationship, is the filling of the machine with water by the energization either of the solenoid 46 alone to provide hot water or else, if switch 100 has been manually closed, by the energization of solenoids 45 and 46 together to cause warm water to be provided to the machine. The energization of the solenoids causes motors 21 and 87 to remain inactive until the closure of switch 77 at a predetermined liquid level.

At this point, the solenoids are de-energized and, consequently motors 21 and 87 are energized. The energization of motor 21 is in the direction to cause agitator operation (because of switch 111) and to provide a recirculation action by pump 29, drawing water from the tub through inlet conduit 33 and then discharging it back into the tub through outlet conduit 34. The drain pump is operating in the direction to tend to pump toward conduit 30. This action, which conventionally is called the washing operation, continues for a predetermined time until pause A is reached, at which time cam 91 opens switch 107. This stops the operation of motor 21 and consequently there is no further agitation although, as explained, the timer motor 87 continues to operate. During pause A, cam 88 closes all three contacts 95, 96 and 97 of switch 94 together to connect conductor 102 entirely independently of water level switch 77 and so as to exclude the valve solenoids 45 and 46. Also at this time cam 90 reverses the position of switch 111.

The reversal of switch 111 reverses the polarity of start winding 60 relative to main winding 105. As a result, when, at the end of pause A, switch 107 is re-closed by cam 91, motor 21 is energized once again but in the opposite direction. The energization of the motor 21 and the de-energization of the valve solenoids result from the fact that the valve solenoids are bypassed by the new condition of switch 94. As a result of the opposite rotation of motor 21, the motor causes a spin operation and simultaneously operates the pump 28 in the direction to cause draining of the liquid out of the tub, that is, drawing liquid from inlet conduit 30 and expelling it through outlet conduit 32. The pump 29 is ineffective during this operation, tending to draw in fluid through conduit 34 and expel it through conduit 33.

The spin operation is provided at a relatively high speed of rotation which may, for instance, be on the order of 600 r.p.m. so as to extract a very substantial part of the liquid from the clothes and have it removed by the pump 28. The spin operation continues until pause B, as shown in FIG. 5, at which time switch 107 is again opened by cam 91 to de-energize motor 21. At this time, cam 88 returns switch 94 to the same position that it had for wash. In addition, it is conventional at this time to change the position of switch 101 to its "up" position so that the cold water solenoid is energized. Switch 94 also returns to the same position that it had for wash, with the contact 97 disengaged from the other two contacts, and the motor connections are reversed to provide agitation rather than spin action. Thus, when pause B is terminated by the reclosing of the switch 107 by cam 91, water enters the basket until the switch 77 is tripped, and then an agitation step proceeds in the same manner as the wash step, that is, by the shorting out of the valve solenoid by switch 77.

After a suitable rinsing period, another pause C is provided and then another spin operation in the same manner as before, after which cam 88 opens all three contacts of switch 94 to terminate the operation completely by de-energizing all components of the system.

As mentioned earlier a fill control and leveling system of the type involved herein is particularly useful with an automatic washer wherein it is desirable to provide a simple and yet reliable control of admission of water to the washer while simultaneously assuring a balanced distribution of weight among the support members of the machine. From the foregoing description it should now be apparent that the present invention is significantly simpler than prior art machines employing separate and distinct mechanisms for controlling the water fill and machine balancing. Furthermore, my invention does not divert a portion of the inlet flow from the washing basket to operate the fill control and thereby waste water. A significant aspect of the present invention is that the reliability of this separate and distinct fill control and leveling mechanisms of prior art machines is obtained with the use of one single, simplified interrelated system employing the pressure of a fluid as a sensing agent for the fill control and as a balancing agent for the leveling mechanism.

As will be evident from the foregoing description, certain aspects of the invention are not limited to the particular details of construction of the examples illustrated, and it is therefore contemplated that other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. In an automatic clothes washer having a supporting structure frame, a basket rotatably supported within said structure for washing and rinsing clothes therein and for centrifugally extracting liquid therefrom, and conduit means adapted for connection to a source of water under pressure and adapted to deliver water to said basket, the improvement of a positive fill control and weight distribution system comprising:

at least three legs depending from said frame and adapted to engage a supporting surface;

at least two of said legs each comprising a member adapted to engage the supporting surface and an associated chamber means defining a volume of fluid under pressure for exerting a force on said member in proportion of the pressure within said chamber means;

a fluid containing pressure equalization conduit interconnecting each of said chamber means to equalize the pressures within said chamber means and hence to equalize the forces exerted on said members, said pressure being a function of the combined weight of said washer, the contents of said basket, and the liquid supplied to said basket, said chamber means and said conduit defining a pressurized system; and a pressure responsive actuating means interconnected with said pressurized system to terminate the admission of water to said washer in response to an increase in said pressure caused by the addition of a predetermined weight of materials and liquid to said basket.

2. The device of claim 1 wherein each of said chamber means comprises a cylinder and each of said members comprises a piston mounted for reciprocation within its associated cylinder.

3. The device of claim 2 wherein each of said cylinders is rigidly attached to said frame and opens downwardly for vertical reciprocation of a separate one of said pistons therein.

4. In an automatic clothes washer having a supporting structure, a basket rotatably supported within said structure for washing and rinsing clothes therein and for centrifugally extracting liquid therefrom, and conduit means adapted for connection to a source of water under pressure and adapted to deliver water to said basket, the improvement of a positive fill control and weight distribution system comprising:

at least three legs depending from said frame and adapted to engage a supporting surface;

at least two of said legs each comprising a downwardly opening leg cylinder secured to said frame, and a leg piston reciprocally positioned within said leg cylinder defining therein a volume above each of said pistons wherein fluid is provided;

a pressure equalization conduit interconnecting each of said cylinders to equalize the pressure within said cylinders and hence to equalize the forces exerted on said leg pistons regardless of the varying relative extended lengths on said leg pistons as occasioned by unevenness in the supporting surface, said pressure being a function of the combined weight of said washer, the contents of said basket, and the liquid supplied to said basket;

a branch conduit communicating at one end with said pressure equalization conduit;

a control cylinder in communication with the other end of said branch conduit;

a control piston disposed within said control cylinder for reciprocation therein;

biasing means for urging said control piston into said control cylinder; and control means selectively positioned within the path of reciprocation of said control piston for shutting off the flow of water to said basket when said pressure is increased to a predetermined value by the weight of water being added to said washing basket.

5. The system of claim 4 wherein said control means comprises:

an electrically actuated valve to control the flow of water to said basket;

an electrical switch adapted to close said electrically actuated valve and thereby shut off the flow of water to said basket when activated by said control piston; and mounting means for selectively positioning said electrical switch within said path of reciprocation of said control piston;

whereby the position of said switch is determinative of the extent of outward reciprocation of said control piston required to activate said switch and hence is determinative of the quantity of water that must be added to said basket before said switch will shut off the flow thereto.

6. In an automatic clothes washing machine having a supporting structure, a basket rotatably supported within said structure for washing and rinsing clothes therein and for centrifugally extracting liquid therefrom, and conduit means adapted for connection to a source of water under pressure and adapted to deliver water to said basket, the improvement of a positive fill control and leveling system comprising:

four leg structures depending from said structure and adapted to engage a supporting surface;

two of said leg structures each comprising a downwardly opening leg cylinder secured to said frame, and a leg piston reciprocally positioned within said leg cylinder defining therein a volume above each of said pistons wherein fluid may be provided;

a pressure equalization conduit interconnecting each cylinder to equalize the pressure within said cylinders and hence to equalize the forces exerted on said leg pistons regardless of the varying relative extended lengths of said leg pistons as occasioned by unevenness in the supporting frame, said pressure being a function of the combined weight of said machine, the contents of said baskets, and the liquid supplied to said basket;

a branch conduit communicating at one end with said pressure equalization conduit;

a control cylinder in communication with the other end of said branch conduit;

a control piston disposed within said control cylinder for reciprocation therein;

biasing means for urging said control piston into said control cylinder; and actuating means selectively positioned within the path of reciprocation of said control piston for shutting off the flow of water to said washing basket when said pressure is increased to a predetermined value by the weight of water being added to said washing basket;

said actuating means comprising an electrically actuated valve to control the flow of water to said washing basket;

an electrical switch adapted to close said electrically actuated valve and thereby shut off the flow of water to said basket when activated by said control piston; and mounting means for selectively positioning said electrical switch within said path of reciprocation of said control piston, said mounting means comprising a pivotally mounted bracket for supporting said switch, a rotary cam acting against said bracket for pivotally positioning said bracket, biasing means acting upon said bracket to bias said bracket toward engagement with said cam, and means for selectively controlling the rotary position of said cam;

whereby the position of said switch is determinative of the extent of outward reciprocation of said control piston required for switch activation, and hence is determinative of the quantity of water that must be added to said basket before said switch will discontinue the flow thereto.

7. In an automatic fabric washing machine having a supporting structure, a basket rotatably supported within said structure for washing and rinsing fabrics therein and for centrifugally extracting liquid therefrom, and conduit means adapted for connection to a source of water under pressure and adapted to deliver water to said basket, the improvement of a positive fill control and weight distribution system comprising:

a plurality of legs depending from said supporting structure and adapted to engage a supporting surface;

at least one of said legs comprising a member adapted to engage the supporting surface and associated chamber means defining a volume of fluid under pressure for exerting force on said member in proportion to the pressure within said chamber means;

pressure responsive actuating means interconnected with said chamber means to terminate the admission of water to said washer in response to an increase in said pressure caused by the addition of a predetermined weight of materials and liquid to said basket; and stabilization means associated with said at least one leg and adapted to substantially equalize the load supported by each of said legs whereby said washer is stabilized.

8. The invention of claim 7 wherein:

at least two of said legs each comprise a member adapted to engage the supporting surface and an associated chamber means defining a volume of fluid under pressure for exerting a force on said member in proportion to the pressure within said chamber means; and said stabilization means comprises a fluid containing pressure equalization conduit interconnecting each of said chamber means to equalize the forces exerted on said members.

References Cited

UNITED STATES PATENTS

| | | | |
|---|---|---|---|
| 2,660,870 | 12/1953 | Kennedy | 68—24 |
| 3,088,593 | 5/1963 | Stilwell | 68—24X |
| 3,091,107 | 5/1963 | Rhodes | 68—4 |

FOREIGN PATENTS

| | | | |
|---|---|---|---|
| 963,047 | 7/1964 | Great Britain | 68—23.1 |

WILLIAM I. PRICE, Primary Examiner

U.S. Cl. X.R.

68—23.5, 207